United States Patent
Hernandez, Jr. et al.

(10) Patent No.: US 7,490,500 B2
(45) Date of Patent: Feb. 17, 2009

(54) TAPE MEASURE DEVICE AND METHOD OF MANUFACTURING BLADE THEREFOR

(75) Inventors: Hector Ray Hernandez, Jr., Fullerton, CA (US); Jaime Nash, Rancho Santa Margarita, CA (US)

(73) Assignee: Alltrade Tools LLC, Long Beach, CA (US)

( * ) Notice: Subject to any disclaimer, the term of this patent is extended or adjusted under 35 U.S.C. 154(b) by 0 days.

(21) Appl. No.: 11/673,527

(22) Filed: Feb. 9, 2007

(65) Prior Publication Data
US 2007/0240477 A1  Oct. 18, 2007

Related U.S. Application Data

(60) Continuation of application No. 11/430,340, filed on May 9, 2006, now Pat. No. 7,174,654, which is a division of application No. 10/945,679, filed on Sep. 21, 2004, now Pat. No. 7,096,596.

(51) Int. Cl.
   *B21K 29/00* (2006.01)
(52) U.S. Cl. .............. 72/128; 72/253.1; 72/342.1; 72/342.7
(58) Field of Classification Search ............ 72/128, 72/176, 177, 253.1, 256, 257, 274, 276, 286, 72/342.1, 342.7, 342.8, 364, 379.6, 379.2, 72/467; 264/285
See application file for complete search history.

(56) References Cited

U.S. PATENT DOCUMENTS

| | | | |
|---|---|---|---|
| 1,823,489 A * | 9/1931 | De Ridder | 72/166 |
| 1,984,346 A * | 12/1934 | Long | 72/176 |
| 2,956,795 A | 10/1960 | Foster | |
| 3,060,881 A | 10/1962 | Gahlinger | |
| 3,115,249 A * | 12/1963 | Zouraeff et al. | 72/42 |
| 3,602,024 A * | 8/1971 | Sabroff et al. | 72/60 |
| 4,332,543 A * | 6/1982 | Fulton et al. | 425/461 |
| 4,411,072 A | 10/1983 | Rutty et al. | |
| 4,429,462 A | 2/1984 | Rutty et al. | |
| 4,459,753 A | 7/1984 | Nagasawa et al. | |
| 5,079,815 A * | 1/1992 | Carroll | 29/896.6 |
| 6,243,964 B1 | 6/2001 | Murray | |
| 6,324,769 B1 | 12/2001 | Murray | |
| 6,367,161 B1 | 4/2002 | Murray et al. | |
| 6,643,947 B2 | 11/2003 | Murray | |
| 6,662,463 B2 * | 12/2003 | Lee | 33/757 |
| 7,096,596 B2 * | 8/2006 | Hernandez et al. | 33/755 |
| 7,174,654 B2 * | 2/2007 | Hernandez et al. | 33/755 |
| 2002/0029489 A1 | 3/2002 | Murray | |
| 2002/0078585 A1 | 6/2002 | Murray | |

FOREIGN PATENT DOCUMENTS

JP   55122827 A   9/1980

\* cited by examiner

*Primary Examiner*—Edward Tolan
(74) *Attorney, Agent, or Firm*—Fulwider Patton LLP

(57) ABSTRACT

A tape measure device has an elongated blade with a central concave-convex segment with at least one planar segment adjoining edgewise the central concave-convex segment to form a junction that extends substantially along the entire length of the elongated blade. During formation of the blade the junction is annealed to avoid formation of a flaw or incipient fracture along the junction.

7 Claims, 4 Drawing Sheets

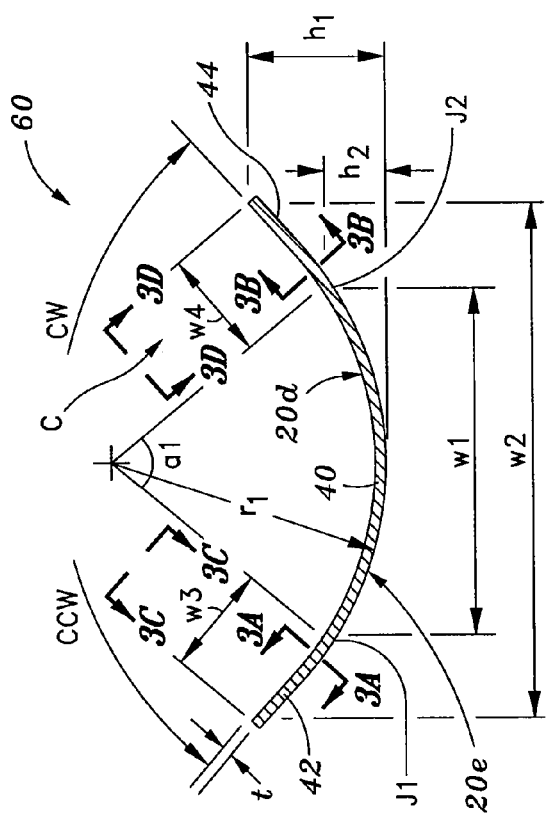
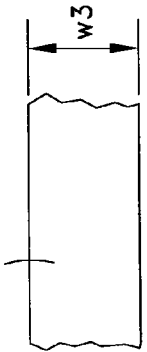
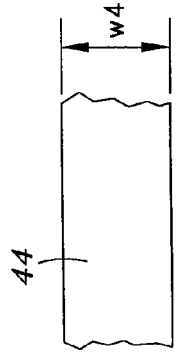
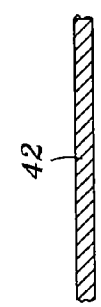

TAPE MEASURE DEVICE AND METHOD OF MANUFACTURING BLADE THEREFOR

CROSS-REFERENCES TO RELATED APPLICATIONS

This application is a continuation of application Ser. No. 11/430,340 now U.S. Pat. No. 7,174,654, filed May 9, 2006; which is divisional of application Ser. No. 10/945,679, filed Sep. 21, 2004, now U.S. Pat. No. 7,096,596, issued Aug. 29, 2006. These related applications are incorporated herein by reference and made a part of this application. Moreover, the inventors incorporate herein by reference any and all U.S. patents, U.S. patent applications, and other documents, hard copy or electronic, cited or referred to in this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

"Rectangular shape" includes square shape.

BACKGROUND OF THE INVENTION

A tape measure is a device used to measure such things as length distance. A tape measure typically comprises an elongated blade that is wound about a reel and stored within a housing. A user employs the tape measure by unwinding the elongated blade, extending the blade through an opening in the housing. The elongated blade has rule 1 markings to measure length and distance.

Examples of tape measures are disclosed in U.S. Pat. Nos. 1 6,324,769; 6,367,161; and 6,662,463. As disclosed in these patents, it is desirable that an extended portion of the elongated blade be as linear as possible. For example, the extended blade portion may have a standout arcuate length of at least ten feet with a horizontal linear length greater than ninety-seven percent of the standout arcuate length. As this extended portion increases in length, its tendency to bend downward also increases due to the increase in the weight of the extended portion. This bending tendency is obviated at least to some degree by controlling the dimensions of the blade and the materials used in its construction. Additionally, the blade's cross-sectional shape is configured to resist bending. For example, the blade's cross-sectional shape may include a concave-convex central section adjoining one or more planar segments. Although this cross-sectional shape resists bending, it presents a problem; namely, along any junction line where a planar segment merges with the concave-convex central section, a flaw or incipient fracture is created using conventional stamping a techniques in manufacturing the elongated blade.

SUMMARY OF THE INVENTION

This invention has one or more features as discussed subsequently herein. After reading the following section entitled "DETAILED DESCRIPTION OF ONE EMBODIMENT OF THIS INVENTION," one will understand how the features of this invention provide its benefits. The benefits of this invention include, but are not limited to, providing a tape measure blade having a cross-sectional configuration that resists bending but avoids during manufacture the formation of flaws or incipient fractures.

Without limiting the scope of this invention as expressed by the claims that follow, some, but not necessarily all, of its features are:

One, the tape measure device of this invention includes an elongated blade that, when in an extended position, has a predetermined cross-sectional curvature formed by a concave-convex segment and at least one planar segment adjoining edgewise the concave-convex segment. At the adjoining edges of these segments a junction is formed that extends substantially along the entire length of the elongated blade. This junction is annealed during formation of the blade to avoid creating a flaw or incipient fracture along the junction.

Two, annealing may comprise passing a substantially flat strip of metallic material lengthwise through a slit opening in a die and heating the strip. The flat strip of metallic material is heated to a temperature substantially above ambient temperature but below the melting point of the metallic material. The die or the material may be heated, or both may be heated, or the flat strip of metallic material may be heated prior to passing it through the slit opening. The metallic material may be selected from the group consisting of chromium, nickel, carbon, and iron. A strip made from these materials is flexible and resilient material. In the case of steel strip material, the strip passes through the die at a rate from about 100 to about 200 linear feet per minute and is heated to a temperature from about 500 to about 700 degrees Fahrenheit.

Three, the slit opening has a configuration substantially conforming to the predetermined cross-sectional curvature of the blade. In one embodiment, the predetermined cross-sectional curvature of the extended blade portion has predetermined dimensions and the slit opening has dimensions that are slightly less than the predetermined dimensions of the cross-sectional curvature of the extended blade portion. Upon passing such a smaller dimensioned metallic strip through the slit in the die, the ductile metallic material is worked, i.e., stretched.

Four, the flat strip of metallic material may have a minimum of thickness of at least about 0.0030 inch, for example, from about 0.0045 to about 0.0060 inch, and a width from about 0.500 to about 1.625 inches. In one embodiment, the predetermined cross-sectional curvature comprises a central concave-convex segment straddled by a pair of planar segments. The central concave-convex segment may have a radius of curvature from about 0.5 to about 1.0 inch, and the planar segments each may have a width from about 0.25 to about 0.75 inch. The planar segments may be substantially equal in width.

These features are not listed in any rank order nor is this list intended to be exhaustive.

BRIEF DESCRIPTION OF THE DRAWINGS

One embodiment of this invention, illustrating all its features, will now be discussed in detail. This embodiment depicts the novel and non-obvious tape measure device of this invention as shown in the accompanying drawing, which is for illustrative purposes only. This drawing includes the following Figures (Figs.), with like numerals indicating like parts:

FIG. 3 is a cross-sectional view of the elongated blade taken along line 3-3 in FIG. 2A.

FIG. 3A is a partial, cross-sectional view of the elongated blade taken along line 3A-3A in FIG. 3.

FIG. 3B is a partial, cross-sectional view of the elongated blade taken along line 3B-3B n FIG. 3.

FIG. 3C is a plan view taken along line 3C-3C in FIG. 3.

FIG. 3D is a plan view taken along line 3D-3D in FIG. 3.

DETAILED DESCRIPTION OF THE PREFERRED EMBODIMENTS

Figure 2:
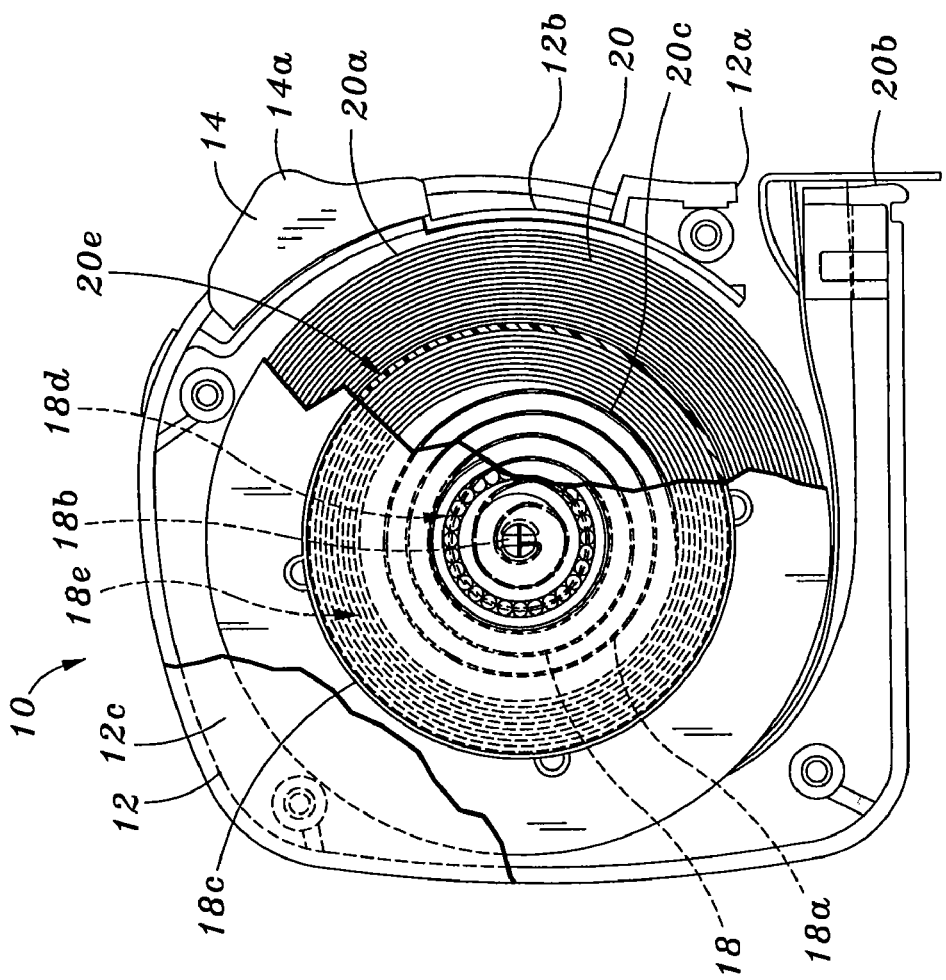
FIG. 2 is a side view of the tape measure device shown in FIG. 1 with portions broken away and the blade completely retracted.
Figure 1:
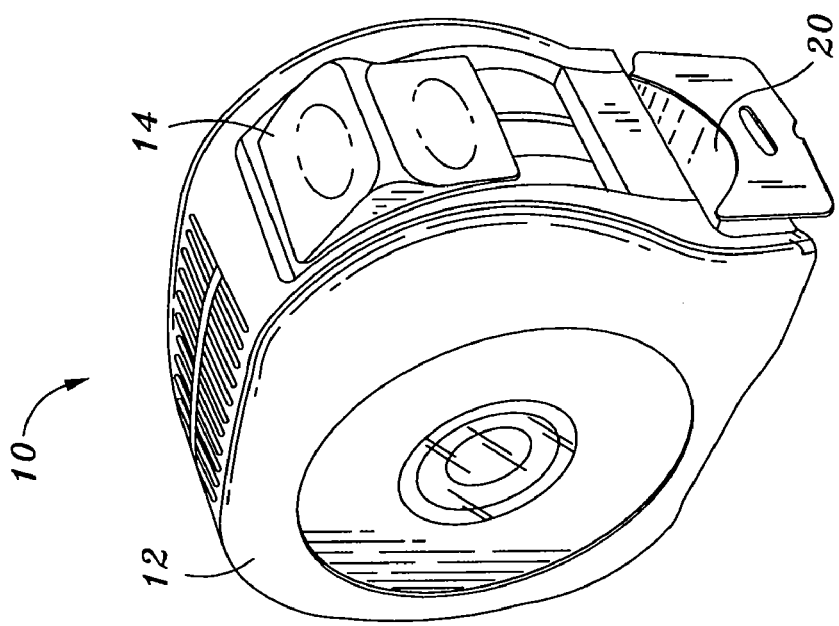
FIG. 1 is a perspective view of the tape measure device according to one embodiment of this invention.
Figure 5:
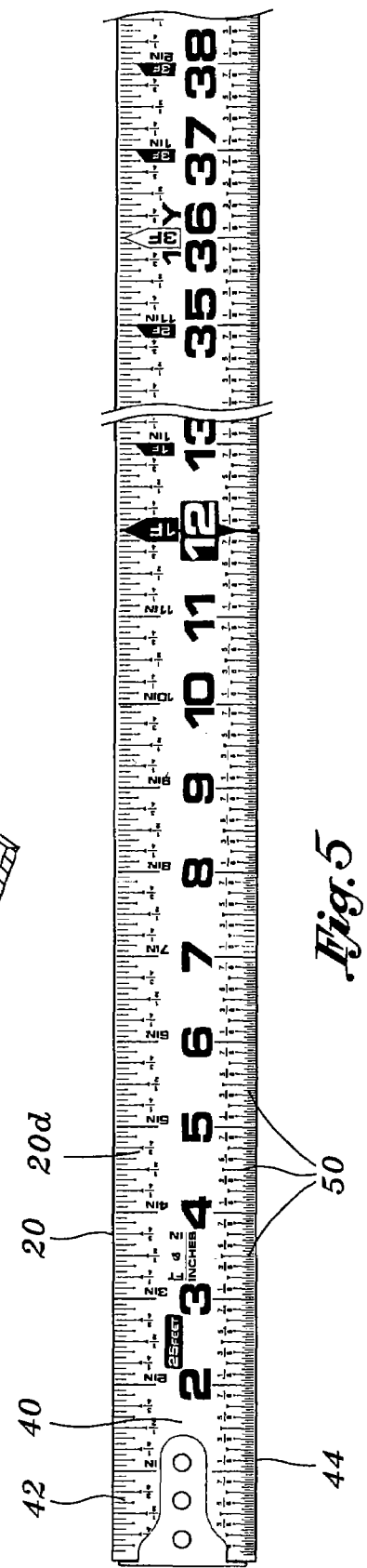
FIG. 5 is a plan view of the blade illustrating the ruled markings on the surface of the blade used in the tape measure device shown in FIG. 1.

As shown in FIGS. 1 through 3, the tape measure device 10 of the present invention includes an elongated blade 20 heat-treated and worked in accordance with this invention. This blade 20 is stored in a wound-up condition in a blade holding assembly 14 mounted to a housing 12. As shown in FIG. 5, the elongated blade 20 has on at least one surface graduated markings 50, for example ruled lines denoting inches and fractions thereof, located on a top side 20$d$, thus allowing a user to measure length or distance. Ruled lines denoting metric lengths or distance may also be used. The housing 12 is a box-like structure having a substantially rectangular shape when view from the side as shown in FIG. 2. Within the housing 12 is an internal chamber 12$c$ that receives a reel 18, a component of the blade holding assembly 14. The blade 20 has an internal end 20$c$ connected to the reel 18 and a free end 20$b$ extending outwardly through an opening 12$a$ in the housing 12.

Figure 2A:
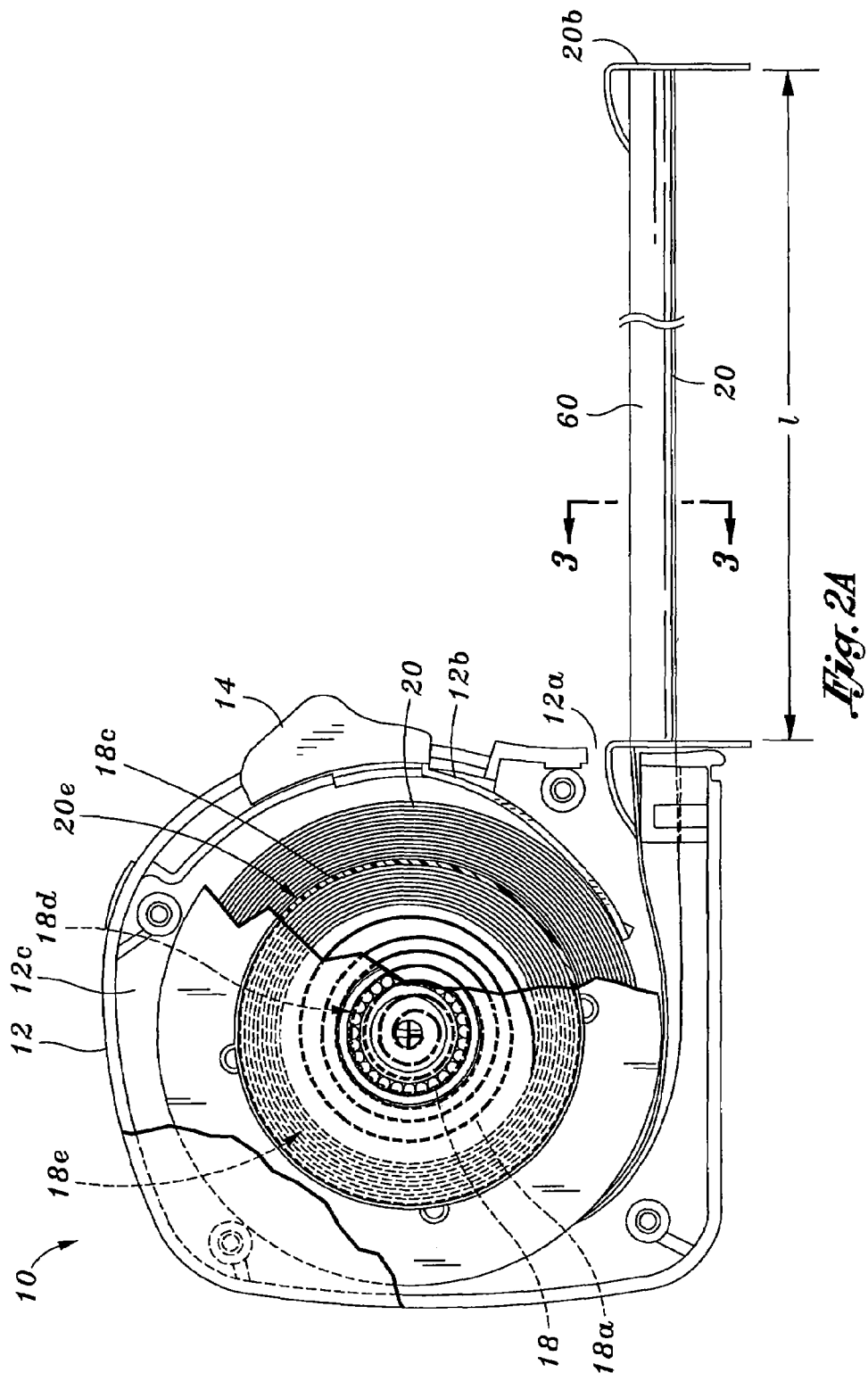
FIG. 2A is a side view similar to that of FIG. 2 with portions broken away and the blade partially unwound and a portion thereof in an extended position.

As shown in FIG. 2A, the blade holding assembly 14 is of conventional design, being manually actuated to hold a selected portion 60 (FIG. 2A) of the blade 20 in an extended position and manually actuated to release the extended blade 20, rewinding the blade portion 60 about the reel 18. The blade 20 is unwound manually to extend outwardly from the opening 12$a$ in the housing 12 any selected portion 60 of the blade 20 as determined by the user. The blade holding assembly 14 includes the reel 18 about which the blade 20 is normally completely wound about as shown in FIG. 2 and a button 14$a$ on the exterior of the housing 12 for operating a brake 12$b$ located within the housing 12. In one position of the button 14$a$ as shown in FIG. 2, the brake 12$b$ is disengaged. In another position shown in FIG. 2A, the brake 12$b$ is engaged to hold the selected extended portion 60 in place. The blade 20 may be withdrawn from the housing 12 when the brake 12$b$ is engaged, so the blade is held in any desired extended position. Release of the brake 12$b$ initiates the rewinding of the extended blade portion 60.

The reel 18 is mounted within the internal chamber 12$c$ for rotation. It includes a cylinder 18$c$, a coil spring 18$a$ operatively disposed within the cylinder 18$c$, and a central shaft 18$b$ connected to the housing 12 about which the reel rotates. The coil spring 18$a$ has one end 18$d$ attached to the central rod 18$b$ and its other end 18$e$ attached to the cylinder 18$c$. The coiled spring 18$a$ is tightened as the blade 20 is manually pulled from the housing 12 so that it may rewind the extended portion 60 of the blade 20 onto the reel 18 upon manipulation of the button 14$a$ to release the brake 12$b$. The blade 20 is attached at its one end 20$c$ to the cylinder 18$c$. As the blade 20 is pulled from the housing 12, it extends tangentially to the cylinder 18$c$.

The brake 12$b$ is located within the housing 12 and with the button 14$a$ in the position shown in FIG. 2A, the brake is engaged to push against a wound-up portion 20$a$ of the elongated blade 20 to inhibit the reel 18 from rotating but not so strong as to prevent a user from further unwinding the blade from the reel 18. As the blade 20 is extended, the brake 12$b$ as shown in FIG. 2A continuously presses against the wound-up portion 20$a$, holding the blade in any desired extended position (FIG. 2A) until the user pushes the button 14$a$, sliding the button upward as viewed in FIG. 2A along the exterior of the housing 12, moving the button to its disengaged position shown in FIG. 2. Pushing the button 14$a$ upward, lifts the brake 12$b$ from the wound up portion 20$a$. Due to the action of the spring 18$a$, the reel rotates counter-clockwise as viewed in FIG. 2A, rewinding the blade 20 around the reel 18 to flatten the blade as it is wound about the reel. The blade holding assembly 14 thus enables the user to control the operation of the reel 18 so the blade remains in the selected extended position until the button 14$a$ is actuated.

The extended portion 60 of the blade 20 has a curved cross-section as shown in FIG. 3. The blade 20 is substantially flat when wound about the reel 18 and its topside 20$d$ faces the reel and its bottom side 20$e$ faces away from the reel. The blade 20 in the wound up and flattened condition may have a width of at least about 1 inch, for example, from about 1.600 to about 1.625 inches. The blade's thickness may be about 0.0045 inches, for example, from about 0.0030 to about 0.0060 inches. The extended portion 60 of the blade 20 has a cross-sectional curvature C that is substantially uniform along the entire length 1 of the extended portion 60. This cross-sectional curvature C comprises an arcuate, concave-convex central section 40 and a pair of lateral, substantially flat planar end segments 42, 44 that straddle the concave-convex central section. The adjoining edges of the planar end segments 42, 44 and central section 40 merge at the junction line J1 and J2 extending along the length of the blade 20. The arcuate, concave-convex central section 40 may have a radius of curvature $r_1$ from about 0.5 inch to about 1.0 inch, a height $h_2$ from about 0.100 inch to about 0.250 inch, a width $w_1$ from about 0.600 2 inch to about 0.925 inch, and spans an angle $a_1$ from about 71.0 degrees to about 105.0 degrees. The extended, elongated blade 60 has a blade height $h_1$ from about 0.125 inch to about 0.500 inch, and a width $w_2$ from about 0.925 inch to about 1.25 inch. Each of the planar end segments 42, 44 has a width $w_3$ and $w_4$, respectively, that are equal, for example from about 0.250 inch to about 0.750 inch.

The extended portion 60 of the elongated blade 20 may have a standout arcuate length of at least ten feet with a horizontal linear length greater than ninety-seven percent of the standout arcuate length. When wound-up around the reel 18, the blade 20 is flattened. Upon moving from the selected extended position (FIG. 2A) to the wound-up position (FIG. 2), the lateral planar segment 42 moves in a counter-clockwise direction as viewed in FIG. 3, and the lateral planar segment 44 moves in a clockwise direction as viewed in FIG. 3.

Figure 4:
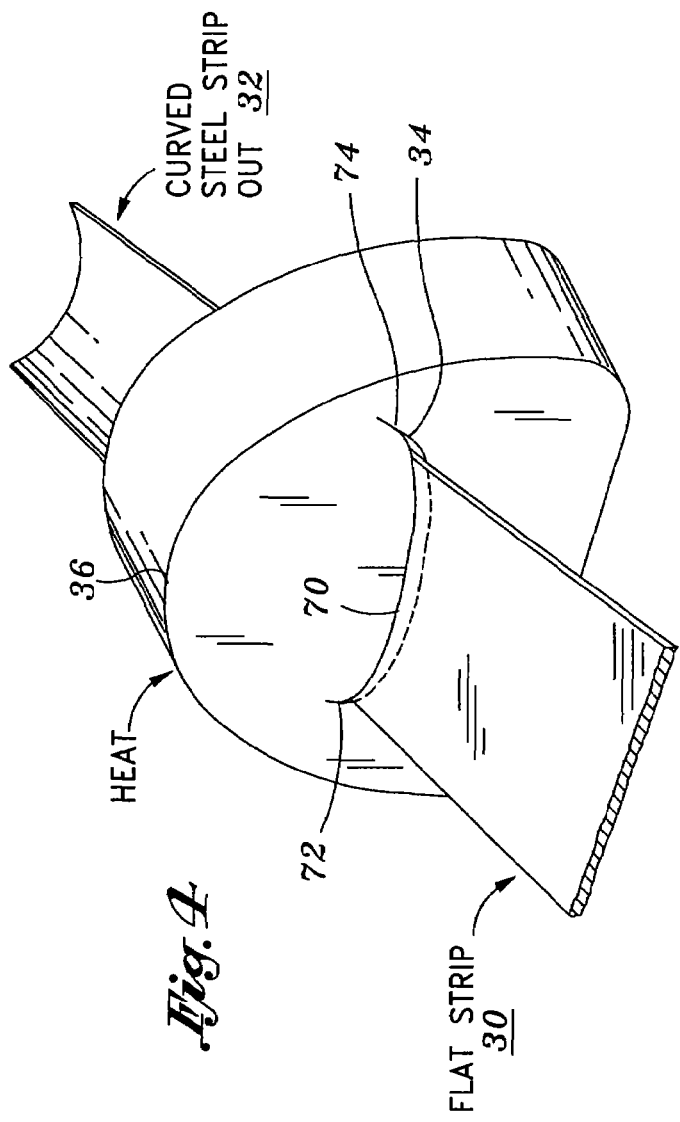
FIG. 4 is a perspective view illustrating a flat strip of metal passing through a die to form the blade according to this invention.

In accordance with one feature of this invention, an annealing process is employed to form the blade 20. Referring to FIG. 4, the elongated blade 20 is formed from a flat strip of metallic material 30 that is heat-treated and worked according to this invention. The flat strip metallic material 30 may be selected from the group consisting of chromium, nickel carbon, and iron. The flat strip of metallic material 30 is heated and passed through a die 36 with a slit 34 having a shape and dimensions that are substantially identical to those of the cross-sectional curvature C of the blade 20. Specifically, the slit 34 has a concave-convex pattern 70 straddled by a pair of lateral planar end segments 72, 74 to produce a curved metal strip 32. The temperature is sufficient to heat the flat strip of metallic material 30 above ambient temperature but below its melting point, for example, a steel strip is heated to a temperature from about 500 to about 700 degrees Fahrenheit. The die may also be heated. Such a flat strip of the steel material 30 may pass through the slit 34 in the die 36 at a rate from about 100 to about 200 linear feet per minute. The slit 34 may have dimensions that are slightly less that the cross-sectional dimensions of the cross-sectional curvature C of the blade 20 to work the strip of metallic material 30, pulling the ductile metallic material slightly as it passing through the slit 34. The curved steel strip 32 as it emerges from the die 36 is cooled to ambient temperature to complete the annealing process.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

We claim:

1. A method of manufacturing an elongated blade for a tape measure device from a substantially flat strip of metallic material, said elongated blade having a predetermined cross-sectional curved configuration comprising a concave-convex segment and at least one planar segment adjoining edgewise the concave-convex segment to form a junction that extends substantially along the entire length of the elongated blade, said method comprising:

passing a substantially flat metallic strip through a slit opening in a die, said slit opening having a configuration substantially conforming to said predetermined cross-sectional curved configuration;

annealing said junction to avoid formation of a flaw or incipient fracture along the junction;

where the annealing comprises passing said flat metallic strip lengthwise through the slit opening and heating to a temperature substantially above ambient temperature but below melting point of the metallic material, and where the flat strip of metallic material is heated prior to passing said strip through the slit opening, and, further, where the die is heated to a temperature substantially from 500 to 700 degrees Fahrenheit; and where the metallic material is selected from the group comprising chromium, nickel, carbon, and iron.

2. The method of claim 1 where the predetermined cross-sectional curvature of the extended blade portion has predetermined dimensions and the slit opening has dimensions that are slightly less than said predetermined dimensions of the cross-sectional curvature of the extended blade portion.

3. The method of claim 1 where the strip passes through the die at a rate substantially from 100 to 200 linear feet per minute.

4. A method of manufacturing an elongated blade for a tape measure device from a substantially flat strip of metallic material, said elongated blade having a predetermined cross-sectional curved configuration comprising a concave-convex segment and at least one planar segment adjoining edgewise the concave-convex segment to form a junction that extends substantially along the entire length of the elongated blade, said method comprising:

passing a substantially flat metallic strip through a slit opening in a die, said slit opening having a configuration substantially conforming to said predetermined cross-sectional curved configuration;

annealing said junction to avoid formation of a flaw or incipient fracture along the junction;

where the annealing comprises passing said flat metallic strip lengthwise through the slit opening and heating to a temperature substantially above ambient temperature but below melting point of the metallic material, and where the flat strip of metallic material is heated and the die is simultaneously heated as the flat strip of metallic passes through the slit opening; and where the die is heated to a temperature substantially from 500 to 700 degrees Fahrenheit.

5. The method of claim 4 where the predetermined cross-sectional curvature of the extended blade portion has predetermined dimensions and the slit opening has dimensions that are slightly less than said predetermined dimensions of the cross-sectional curvature of the extended blade portion.

6. The method of claim 4 where the strip is steel and passes through the die at a rate substantially from 100 to 200 linear feet per minute.

7. The method of claim 4 where the metallic material is selected from the group comprising chromium, nickel, carbon, and iron.

* * * * *

UNITED STATES PATENT AND TRADEMARK OFFICE
CERTIFICATE OF CORRECTION

PATENT NO.        : 7,490,500 B2
APPLICATION NO.   : 11/673527
DATED             : February 17, 2009
INVENTOR(S)       : Hector Ray Hernandez, Jr. et al.

It is certified that error appears in the above-identified patent and that said Letters Patent is hereby corrected as shown below:

Column 6, line 12, after "strip" insert --is steel and--.

Signed and Sealed this

Thirtieth Day of June, 2009

JOHN DOLL
*Acting Director of the United States Patent and Trademark Office*